(12) United States Patent
Qiu et al.

(10) Patent No.: US 9,451,163 B2
(45) Date of Patent: Sep. 20, 2016

(54) MOTION SENSOR ASSISTED RATE CONTROL FOR VIDEO ENCODING

(75) Inventors: Gang Qiu, Markham (CA); Wentao Xu, Markham (CA); Liang Shen, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 293 days.

(21) Appl. No.: 13/470,182

(22) Filed: May 11, 2012

(65) Prior Publication Data

US 2013/0301706 A1  Nov. 14, 2013

(51) Int. Cl.
| | |
|---|---|
| *H04N 11/02* | (2006.01) |
| *H04N 5/232* | (2006.01) |
| *H04N 19/107* | (2014.01) |
| *H04N 19/124* | (2014.01) |
| *H04N 19/132* | (2014.01) |
| *H04N 19/137* | (2014.01) |

(52) U.S. Cl.
CPC ...... *H04N 5/23258* (2013.01); *H04N 5/23267* (2013.01); *H04N 19/107* (2014.11); *H04N 19/124* (2014.11); *H04N 19/132* (2014.11); *H04N 19/137* (2014.11)

(58) Field of Classification Search
CPC ............ H04N 19/0003; H04N 19/0009; H04N 19/00127; H04N 19/00145
USPC .............................. 375/240.03, E7.126
See application file for complete search history.

(56) References Cited

U.S. PATENT DOCUMENTS

| | | | | | |
|---|---|---|---|---|---|
| 5,670,953 | A | * | 9/1997 | Satoh et al. ............... | 340/903 |
| 8,705,614 | B2 | * | 4/2014 | Ramakrishnan ......... | 375/240.01 |
| 2002/0034318 | A1 | * | 3/2002 | Sim ............................... | 382/107 |
| 2003/0081675 | A1 | * | 5/2003 | Sadeh et al. ............. | 375/240.03 |
| 2004/0184534 | A1 | * | 9/2004 | Wang ....................... | 375/240.03 |
| 2006/0198443 | A1 | | 9/2006 | Liang et al. | |
| 2007/0171972 | A1 | | 7/2007 | Tian et al. | |
| 2007/0296821 | A1 | * | 12/2007 | Kakkori ................... | 348/208.6 |
| 2008/0084925 | A1 | * | 4/2008 | Rozen et al. ............. | 375/240.01 |
| 2009/0168884 | A1 | * | 7/2009 | Lu ........................... | H04N 19/56 375/240.16 |
| 2010/0021071 | A1 | * | 1/2010 | Wittmann et al. ............. | 382/232 |
| 2010/0098162 | A1 | * | 4/2010 | Lu et al. .................. | 375/240.13 |

(Continued)

FOREIGN PATENT DOCUMENTS

| | | |
|---|---|---|
| JP | 2000092499 A | 3/2000 |
| JP | 2009110610 A | 5/2009 |

(Continued)

OTHER PUBLICATIONS

International Search Report and Written Opinion—PCT/US2013/039959—ISA/EPO—Jul. 5, 2013.

(Continued)

*Primary Examiner* — James M Anderson, II
(74) *Attorney, Agent, or Firm* — Knobbe Martens Olson & Bear, LLP

(57) ABSTRACT

The system and methods for motion sensor assisted rate control for video encoding are provided. An apparatus for encoding video content comprises a sensor and an encoder. The sensor is configured to provide motion information relating to the apparatus. The encoder is configured to encode the video content based at least in part on a quantization parameter. The encoder is further configured to increase the value of the quantization parameter in response to the provided motion information.

24 Claims, 4 Drawing Sheets

(56) References Cited

U.S. PATENT DOCUMENTS

| | | |
|---|---|---|
| 2010/0309975 A1 | 12/2010 | Zhou et al. |
| 2011/0051813 A1* | 3/2011 | Krishnan ............ H04N 7/26835 375/240.16 |
| 2011/0058055 A1 | 3/2011 | Lindahl et al. |
| 2011/0110420 A1* | 5/2011 | Liang et al. ............. 375/240.03 |
| 2011/0249086 A1* | 10/2011 | Guo et al. ................. 348/14.12 |
| 2011/0292997 A1 | 12/2011 | An et al. |
| 2011/0298942 A1 | 12/2011 | Uchida et al. |
| 2012/0069152 A1* | 3/2012 | Kusaka ........................... 348/47 |
| 2012/0082392 A1 | 4/2012 | Kwon et al. |
| 2012/0328008 A1 | 12/2012 | Uchida et al. |
| 2013/0155264 A1* | 6/2013 | Zhou ........................ 348/208.6 |

FOREIGN PATENT DOCUMENTS

| | | |
|---|---|---|
| KR | 20070038644 A | 4/2007 |
| WO | 2007047755 | 4/2007 |
| WO | 2008131438 A2 | 10/2008 |
| WO | 2011111292 A1 | 9/2011 |
| WO | WO 2011111292 A1 * | 9/2011 |

OTHER PUBLICATIONS

Sullivan, G., et al. "Joint Model Reference Encoding Methods and Decoding Concealment Methods; Section 2.6: Rate Control" JVT-1049, San Diego, Sep. 2003, pp. 1-39.

An C., "Motion blur adaptive Rate Control", 2010 44th Asilomar Conference on Signals, Systems and Computers—Nov. 7-10, 2010—Pacific Grove, CA, USA, IEEE, Piscataway, NJ, USA, Nov. 7, 2010, pp. 426-429, XP031860650, DOI: 10.1109/ACSSC.2010.5757593, ISBN: 978-1-4244-9722-5.

* cited by examiner

MOTION SENSOR ASSISTED RATE CONTROL FOR VIDEO ENCODING

BACKGROUND

1. Field

The present application relates generally to handheld devices with video encoding capabilities, and more specifically to systems and methods for rate control for video encoding based on motion information.

2. Background

Digital video capabilities can be incorporated into a wide range of devices, including digital cameras, digital recording devices, cellular or satellite radio telephones, personal digital assistants (PDAs), video gaming devices, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

During the process of real time video capturing and encoding using such a digital video device, a user may move the device quickly to switch the scene or focus. In such cases, a much smaller value for Quantization Parameter ("QP"), one of the encoding parameters, may be selected than actually needed. This leads to temporary spikes in the bit rate, followed by quick depletions of the bit budget. In order to maintain a constant bit rate, the quality of the upcoming frames is reduced after the movement. However, the subject to be captured after the movement is generally of more interest to the user, and higher video quality is desired after the movement stops.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include systems and methods for implementing motion sensor assisted rate control for video encoding.

One embodiment of the disclosure provides an apparatus for encoding video content. The apparatus comprises a sensor configured to provide motion information relating to the apparatus. The apparatus further comprises an encoder configured to encode the video content based at least in part on a quantization parameter. The encoder is further configured to increase a value of the quantization parameter in response to the provided motion information.

Another embodiment of the disclosure provides an apparatus for encoding video content. The apparatus comprises means for providing motion information relating to the apparatus and means for encoding the video content based at least in part on a quantization parameter. The means for encoding the video content is further configured to increase a value of the quantization parameter in response to the provided motion information.

Yet another embodiment of the disclosure provides a method of encoding video content. The method comprises obtaining motion information relating to an apparatus comprising a sensor and an encoder, using the sensor. The method further comprises encoding the video content based at least in part on a quantization parameter using the encoder. The method also comprises increasing a value of the quantization parameter in response to the obtained motion information.

Another embodiment of the disclosure provides a computer-readable medium storing instructions that cause an encoder to receive motion information relating to an apparatus comprising the encoder. The instructions further cause the encoder to encode video content at least based in part on a quantization parameter and to increase a value of the quantization parameter in response to the received motion information.

DETAILED DESCRIPTION

Figure 1:
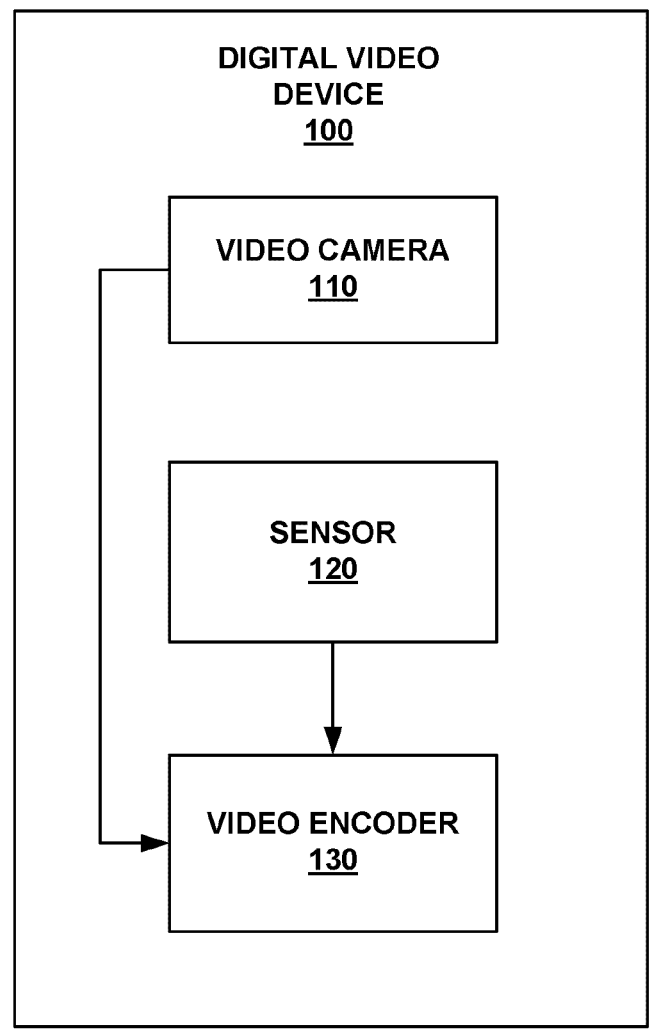
FIG. 1 is a block diagram of an example device that may implement motion sensor assisted rate control for video encoding.

Many handheld digital video devices include a sensor that can readily provide motion information. A fast or strong motion of a device generally leads to a scene change in the upcoming captured video frame sequence, and the recording quality during a fast or strong motion is relatively less important than after such motion. Therefore, in one aspect, the motion information from the sensor is provided to the encoder so that the encoder can adjust the encoding parameters in relation to the speed and strength of the motion. More specifically, when a fast or strong device motion is identified, the QP for the upcoming video frames is increased by a value proportional to the speed/strength of the motion to mitigate the spike in bit rate.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The systems and methods described herein relate to implementing motion sensor assisted rate control for video encoding. Many handheld digital video devices include a motion sensor that can readily provide motion information relating to the digital video devices. The motion sensor can be an accelerometer sensor, a gyroscope sensor, a magnetometer sensor, or any other sensor, or a combination thereof that can provide motion information about the digital video device. In one aspect, the provided motion information is used to make rate control decisions for video encoding. Users may not be interested in the subject to be captured during a sudden or strong movement, which generally indicates a scene change. The motion information could be used to determine the speed or strength of the motion of the digital video device. If the detected motion meets a speed or strength threshold, a higher value for Quantization Parameter ("QP") is selected than when the detected motion is below such threshold. Selecting a higher value for QP generally leads to a lower encoding rate. By decreasing the encoding rate during a fast or strong movement, more bits can be allocated following the movement, i.e., after the movement stops.

Rate control is employed by a video encoder to allocate bit budgets over a certain period of time in order to achieve the target bit rate for a certain Quality of Services (QoS). Generally, a constant bit rate (CBR) is desired for streaming video over limited capacity communication channels, where the instantaneous bit rate is required to not exceed the data rate of the communications path. Even in some rate adaptive communications, like the Internet, where a variable bit rate (VBR) can be used, most real-time video applications impose severe constraints on network delay and throughput performance. To accommodate these constraints, it may be desirable to implement preventive rate control to avoid network congestion.

A rate control algorithm dynamically adjusts encoding parameters, most notably the Quantization Parameter, for the current frame according to the bit budget and statistics of the current frame. Mean Absolute Difference ("MAD") is adopted widely to represent the texture complexity. For example, in H.264/AVC standard, a quadratic model may be used to represent the relationship between target bits, MAD, and QP:

$$T = c_1 \times \frac{MAD_n}{Q_{step}} + c_2 \times \frac{MAD_n}{Q_{step}^2} \quad (1)$$

where $Q_{step}$ is the parameter from which QP is derived, T denotes the texture bits, and $c_1$ and $c_2$ are coefficients estimated empirically. Since $MAD_n$ cannot be accurately known before actual encoding, a linear model, as shown in Equation (2), may be used to predict the current frame $MAD_n$ ("Mean Absolute Difference"):

$$MAD_n = a_1 \times MAD_{n-1} + a_2 \quad (2)$$

where $MAD_n$ is the predicted MAD for the n-th frame and $MAD_{n-1}$ is the actual MAD of the n-1 frame, and $a_1$ and $a_2$ are coefficients chosen empirically depending on implementation. The above rate control works well under steady conditions, where scenes change smoothly and slowly, as long as Equation (2) can be roughly predicated on the MAD of incoming frames.

However, during the process of real time video capturing and encoding using a handheld device, a typical user can move the device quickly to switch the scene or focus. Such motions of the device pose special challenges to video encoding. In such cases, the assumption of Equation (2) is weakened. Because the encoder does not foresee the sudden increase in MAD, the encoder chooses a QP value that is much smaller than actually needed. As a consequence, temporary spikes in bit rate results, followed by quick depletions of the bit budget. To maintain a constant bit rate, the encoder is thereafter forced to drastically reduce the quality of the ensuing frames or even skip some frames altogether. This can result in a poor perceptual video quality for a noticeable period of time after the movement of the device stops.

Many handheld digital video devices include motion sensors. These motion sensors may provide motion information about the devices, especially instant motion information, at little cost. In one aspect, motion information provided by the motion sensors is utilized to adjust and adapt the QP and the encoding rate in order to avoid the temporary spikes in bit rate and the subsequent depletion of the bit budget. In this manner, information from the motion sensors may assist the encoder to make better choices in terms of rate control.

FIG. 1 is a block diagram of an example device 100 that may perform motion sensor assisted rate control for video encoding. The device 100 may be a handheld device including a video camera, such as a digital camera, a camera phone, a video phone, and a video teleconferencing device. In the example of FIG. 1, the device 100 includes a video camera 110, a sensor 120, and a video encoder 130. The video camera 110 can be any device capable of capturing video images in real time.

The sensor 120 obtains and provides motion information relating to the device 100. The sensor 120 may be an accelerometer sensor, a gyroscope sensor, a magnetometer, or any other sensor that can provide motion information relating to the device 100. The device 100 may include one sensor or multiple sensors. If the device 100 includes multiple sensors, the sensors may be of the same type or different types. For example, a device may include an accelerometer sensor, a gyroscope sensor, and a magnetometer.

The video encoder 130 encodes the video data captured by the video camera 110. It may be configured to encode video content based at least in part on the Quantization Parameter. The video encoder 130 can be any encoder that can process real-time video, such as a real-time hardware H.264 encoder. The video encoder 130 may include many different components as shown in detail in FIG. 2, including a rate control unit that controls the encoding rate and the Quantization Parameter based on the motion information provided by the sensor 120.

The motion information obtained by the sensor 120 can include various types of information about the motion of the device 100. In one aspect, the motion information could be instant motion information relating to the device 100. In another aspect, the motion information can relate to translational movement of the device 100, rotational movement of the device 100, or both. The available motion information can also vary depending on the type of motion sensor. For example, an accelerometer sensor can provide a vector of acceleration in the device's coordinate system (e.g., along the x, y, and z axes). A gyroscope sensor can provide angular velocities around three axes (i.e., x, y, and z axes). The sensor readings could be taken at a regular interval, e.g., every 10 ms.

In one aspect, the motion information provided by the sensor 120 is utilized to determine the importance of a subject to a user and the intention of the user. For example, if a movement is sudden or strong, it may be inferred that the user is making a scene change. In such a situation, the subject captured during the movement is of less importance to the user than the subject to be captured after the movement comes to a stop. In order to make sure that sufficient bit rate is allocated after the motion, the Quantization Parameter is increased during the motion to adjust the encoding rate to be lower. In this manner, the image data after the motion can be obtained in sufficient detail, while the image data during the motion is not captured in great detail.

In one aspect, the encoder 130 can respond to fast motion swiftly, provide a better opportunity to optimize bit allocations for incoming frames, level bit rate demand to achieve a consistent quality of service, and enhance perceptual video quality in real-time video encoding use cases, such as video telephony.

Figure 2:
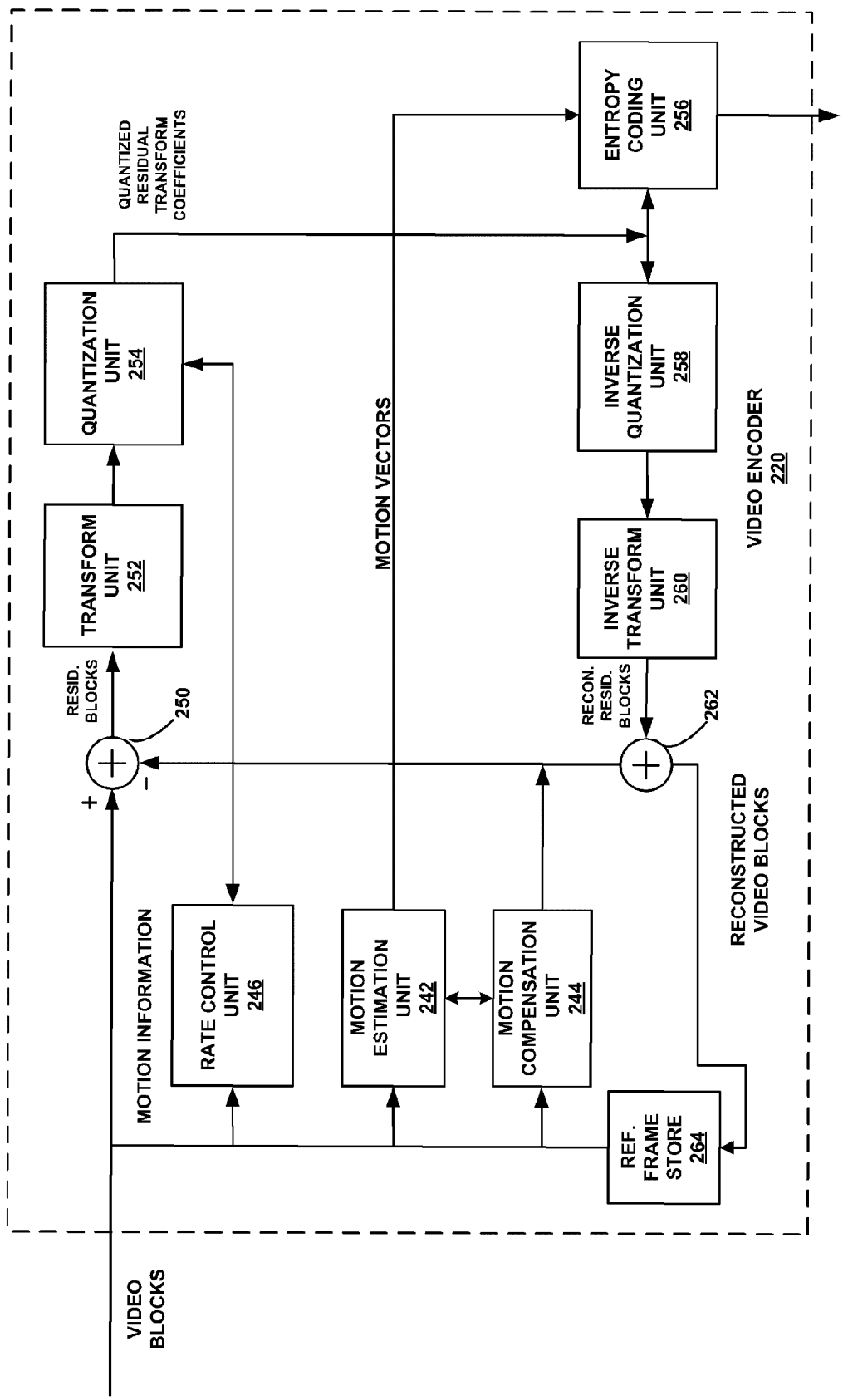
FIG. 2 is a block diagram illustrating an example of a video encoder that may implement motion sensor assisted rate control for video encoding.

FIG. 2 is a block diagram illustrating an example of the video encoder 130 in FIG. 1 that may perform motion sensor assisted rate control for video encoding. Video encoder 220 is an example of a video processing device that may perform motion sensor assisted rate control for video encoding. It should be understood, however, that any video processing device may be configured to perform motion sensor assisted rate control. Moreover, motion sensor assisted rate control may be implemented in any combination of hardware, software, and/or firmware. In the case of software and/or firmware, motion sensor assisted rate control is implemented on an underlying hardware device that executes instructions provided by the software and/or firmware.

Video encoder 220 may operate according to a video compression standard, such as the ITU-T H.264 standard, alternatively described as MPEG 4, Part 10, Advanced Video Coding (AVC). However, video encoder 220 is not limited to any particular coding standard. Other examples include MPEG-2 and ITU-T H.263. Although not shown in FIG. 2, in some aspects, video encoder 220 may be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, devices that generally conform to the H.264 standard may perform motion sensor assisted rate control for video encoding. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

In the example of FIG. 2, video encoder 220 may perform intra- and inter-coding of blocks within video frames, including macroblocks, or partitions or sub-partitions of macroblocks. Intra-coding relies on spatial prediction to reduce or remove spatial redundancy in video within a given video frame. Inter-coding relies on temporal prediction to reduce or remove temporal redundancy in video within adjacent frames of a video sequence. Inter-coding can also be used to remove redundancy between video frames coming from different video sequences representing different views of the same scene, such as in the case of multi-view coding. Intra-mode (I-mode) may refer to any of several spatial based compression modes and inter-modes such as prediction (P-mode) or bi-directional (B-mode) may refer to any of several temporal-based compression modes. Although components for inter-mode encoding are depicted in FIG. 2, it should be understood that video encoder 220 may further include components for intra-mode encoding. However, such components are not illustrated for the sake of brevity and clarity.

As shown in FIG. 2, video encoder 220 receives a current video block within a video frame to be encoded. In the example of FIG. 2, video encoder 220 includes motion compensation unit 244, motion estimation unit 242, reference frame store 264, summer 250, transform unit 252, quantization unit 254, and entropy coding unit 256. For video block reconstruction, video encoder 220 also includes inverse quantization unit 258, inverse transform unit 260, and summer 262. A deblocking filter (not shown in FIG. 2) may also be included to filter block boundaries to remove blockiness artifacts from reconstructed video. If desired, the deblocking filter would typically filter the output of summer 262.

During the encoding process, video encoder 220 receives a video frame or slice to be coded. The frame or slice may be divided into multiple video blocks. Motion estimation unit 242 and motion compensation unit 244 perform inter-predictive coding of the received video block relative to one or more blocks in one or more reference frames to provide temporal compression. An intra prediction unit may also perform intra-predictive coding of the received video block relative to one or more neighboring blocks in the same frame or slice as the block to be coded to provide spatial compression.

Mode select unit (not shown in FIG. 2) may select one of the coding modes, intra or inter, e.g., based on error results, and provide the resulting intra- or inter-coded block to summer 250 to generate residual block data and to summer 262 to reconstruct the encoded block for use as a reference frame.

Motion estimation unit 242 and motion compensation unit 244 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a macroblock. Motion compensation may involve fetching or generating the predictive block based on the motion vector determined by motion estimation. Again, motion estimation unit 242 and motion compensation unit 244 may be functionally integrated, in some examples.

Motion estimation unit 242 calculates a motion vector for the video block of an inter-coded frame by comparing the video block to video blocks of a reference frame in reference frame store 264. Motion compensation unit 244 may also interpolate sub-integer pixels of the reference frame, e.g., an I-frame or a P-frame. The ITU H.264 standard refers to reference frames as "lists." Therefore, data stored in reference frame store 264 may also be considered lists. Motion estimation unit 242 compares blocks of one or more reference frames (or lists) from reference frame store 264 to a block to be encoded of a current frame, e.g., a P-frame or a B-frame. When the reference frames in reference frame store 264 include values for sub-integer pixels, a motion vector calculated by motion estimation unit 242 may refer to a sub-integer pixel location of a reference frame. Motion estimation unit 242 sends the calculated motion vector to entropy coding unit 256 and motion compensation unit 244. The reference frame block identified by a motion vector may be referred to as a predictive block. Motion compensation unit 244 calculates error values for the predictive block of the reference frame.

Motion compensation unit 244 may calculate prediction data based on the predictive block. Video encoder 220 forms a residual video block by subtracting the prediction data from motion compensation unit 244 from the original video block being coded. Summer 250 represents the component or components that perform this subtraction operation. Transform unit 252 applies a transform, such as a discrete cosine transform (DCT) or a conceptually similar transform, to the residual block, producing a video block comprising residual transform coefficient values. Transform unit 252 may perform other transforms, such as those defined by the H.264 standard, which are conceptually similar to DCT. Wavelet transforms, integer transforms, sub-band transforms or other types of transforms could also be used. In any case, transform unit 252 applies the transform to the residual block, producing a block of residual transform coefficients. The transform may convert the residual information from a pixel value domain to a transform domain, such as a frequency domain.

Quantization unit 254 quantizes the residual transform coefficients to further reduce bit rate. The quantization process may reduce the bit depth associated with some or all of the coefficients. The degree of quantization may be modified by adjusting a quantization parameter. In H.264/AVC, a quantization parameter is used for determining the quantization of transform coefficients. The parameter can take 52 values. These values are arranged so that an increase of 1 in quantization parameter means an increase of quantization step size by approximately 12% (an increase of 6 means an increase of quantization step size by exactly a factor of 2). It can be noticed that a change of step size by approximately 12% also means roughly a reduction of bit rate by approximately 12%.

Following quantization, entropy coding unit 256 entropy codes the quantized transform coefficients. For example, entropy coding unit 256 may perform content adaptive variable length coding (CAVLC), context adaptive binary arithmetic coding (CABAC), or another entropy coding technique. Following the entropy coding by entropy coding unit 256, the encoded video may be transmitted to another device or archived for later transmission or retrieval. In the case of context adaptive binary arithmetic coding, context may be based on neighboring macroblocks.

In some cases, entropy coding unit 256 or another unit of video encoder 220 may be configured to perform other coding functions, in addition to entropy coding. For example, entropy coding unit 256 may be configured to determine the CBP values for the macroblocks and partitions. Also, in some cases, entropy coding unit 256 may perform run length coding of the coefficients in a macroblock or partition thereof. In particular, entropy coding unit 256 may apply a zig-zag scan or other scan pattern to scan the transform coefficients in a macroblock or partition and encode runs of zeros for further compression. Entropy coding unit 256 also may construct header information with appropriate syntax elements for transmission in the encoded video bitstream.

Inverse quantization unit 258 and inverse transform unit 260 apply inverse quantization and inverse transformation, respectively, to reconstruct the residual block in the pixel domain, e.g., for later use as a reference block. Motion compensation unit 244 may calculate a reference block by adding the residual block to a predictive block of one of the frames of reference frame store 264. Motion compensation unit 244 may also apply one or more interpolation filters to the reconstructed residual block to calculate sub-integer pixel values. Summer 262 adds the reconstructed residual block to the motion compensated prediction block produced by motion compensation unit 244 to produce a reconstructed video block for storage in reference frame store 264. The reconstructed video block may be used by motion estimation unit 242 and motion compensation unit 244 as a reference block to inter-code a block in a subsequent video frame.

In the example of FIG. 2, video encoder 220 also includes rate control unit 246. In general, rate control unit 246 controls video encoding rate based on motion information provided by a motion sensor. FIG. 2 shows rate control unit 246 as a part of video encoder 220, but it can also be separate from video encoder 220.

Rate control unit 246 receives motion information from the sensor, which may include accelerometer readings, gyroscope sensor readings, or both. The motion information may include information about translation of the device, rotation of the device, or both. In one embodiment, rate control unit 246 determines the appropriate Quantization Parameter based on the speed or strength of a motion as determined from the motion information and sends the Quantization Parameter value to quantization unit 254. If the speed or strength of the motion meets a threshold value, rate control unit 246 increases the Quantization Parameter in proportion to the speed or strength of the motion. Otherwise, rate control unit 246 uses the normal QP value. Rate control unit 246 sends the determined QP value to quantization unit 254, and quantization unit 254 adjusts the quantization parameter accordingly. Quantization unit 254 may provide bit rate information to rate control unit 246.

Figure 3:
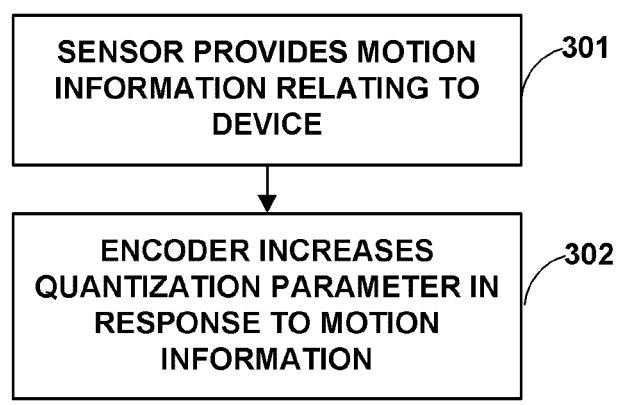
FIG. 3 is a flowchart of an exemplary process for motion sensor assisted rate control for video encoding.

FIG. 3 is a flowchart of an exemplary process for motion sensor assisted rate control for video encoding. Process 300 may be performed by digital video devices like the device 100 in FIG. 1. In one aspect, process 300 may be performed when a user is capturing video data in real-time using a digital video device (e.g., the device 100 in FIG. 1). At step 301 of process 300, the sensor 120 obtains motion information relating to the device 100. The motion information obtained by the sensor 120 is provided to the encoder 130 to perform rate control.

At step 302, the encoder 130 increases the QP in response to the provided motion information. In one aspect, the encoder 130 is configured to encode video content based at least in part on the QP. The encoder 130 calculates the speed and/or strength of a motion of the device based on the motion information received from the sensor 120. If the speed and/or strength of the motion meets or exceeds a threshold value, the encoder 130 increases the QP in proportion to the speed and/or strength of the motion. If the speed and/or strength of the motion falls below the threshold value, the QP is not increased, and the normal QP value is used. Increasing the QP generally results in decreasing the encoding rate.

Depending on the actual implementation of the encoder 130, the QP may need to be increased continuously during the movement. That is, the QP may need to be increased for each detected motion that has a speed or strength equal to or greater than the threshold value. The QP value would have to be increased as long as the movement lasts. In other implementations, the QP is only increased at the start of the movement. The same QP can be used for the duration of the movement.

Figure 4:
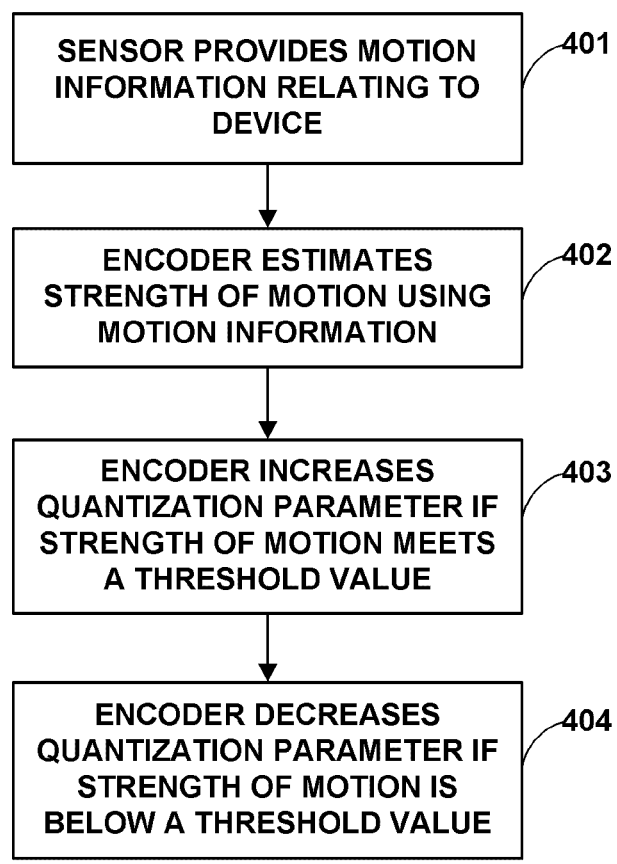
FIG. 4 is a flowchart of an exemplary process for motion sensor assisted rate control for video encoding in more detail.

FIG. 4 is a flowchart of an exemplary process for motion sensor assisted rate control for video encoding in more detail. Process 400 may be performed by digital video devices like the device 100 in FIG. 1. In one aspect, process 400 may be performed when a user is capturing video data in real-time using a digital video device (e.g., the device 100 in FIG. 1). At step 401 of process 400, the sensor 120 obtains and provides motion information. Since the scene captured by the device 100 is subject to the combination of device translation and rotation, the motion of the device 100 can be tracked using motion information provided by a motion sensor like an accelerometer sensor, a gyroscope sensor, a magnetometer sensor, or any combination of the sensors. Generally, encoding efficiency, especially in temporal domain, is negatively correlated to the speed of scene movement (i.e., global motion). Empirically, the higher the velocity of the device, the higher the instant bit rate of the incoming frames will be.

At step 402, the encoder 130 estimates the strength or speed of the motion using the motion information relating to the video device provided by the sensor 120 at step 401. This step may be performed by, for example, the rate control unit 246 as shown in FIG. 2. In one embodiment, the device 100 includes an accelerometer sensor. The accelerometer sensor can provide a vector of acceleration in the coordinate system of the device 100, e.g., along the x, y, and z axes. In one aspect, the sensor readings are based on a combination of the motion of the device 100 itself and the gravitational acceleration. The instant velocity v of the device 100 can be derived using Equation (3) in order to estimate the instant bit rate of the upcoming frame:

$$v = v_0 + \int_0^t (a(t) - g) dt \quad (3)$$

where a(t) indicates the acceleration derived from the accelerometer readings, $v_0$ denotes the initial velocity of the device at time 0, and g indicates the gravitational acceleration. In one aspect, the vector of the motions can be derived from the accelerometer readings by subtracting the gravitational acceleration:

$$\vec{s} = \vec{s}_g - \vec{g} \quad (4)$$

where $\vec{s}_g$ indicates accelerometer readings, the subscript g indicates that the reading includes gravity, and $\vec{g}$ denotes gravitational acceleration vector. However, Equation (4) requires the direction of the $\vec{g}$ being known relative to the device coordinate system, regardless of the posture of the device. Even though the magnitude of $\vec{g}$ is well known to equal 9.81 m/s², the direction of $\vec{g}$ relative to the device orientation is unknown from the accelerometer sensor itself and requires additional input from other sensors like a gyroscope sensor.

Accordingly, in one embodiment, motion strength is estimated using the Mean Squared Difference ("MSD") S of multiple accelerometer readings:

$$S = (x - \bar{x})^2 + (y - \bar{y})^2 + (z - \bar{z})^2 \quad (5)$$

where $$(\bar{x}, \bar{y}, \bar{z}) = \overline{S_g} = \text{mean}\{\vec{s}_g(t)\}, t = [n \ldots m] \quad (6).$$

For example, 50 accelerometer readings may be used to determine the mean square difference. Using the mean square difference of multiple readings may eliminate the need to calibrate the accelerometer sensor, and motion sensor assisted rate control could also work well with sensors that are not sensitive or sophisticated. The mean square difference S is compared to a threshold to determine whether the motion of the device 100 is strong enough as follows:

$$S = \begin{cases} \geq T, \text{ strong motion starts} \\ < T, \text{ smooth motion.} \end{cases} \quad (7)$$

At step 403, the encoder 130 increases the QP if the strength of the motion meets the threshold value. For a motion that has a strength equal to or greater than the threshold, it could be assumed that the scene will be much different from the previous frames. Accordingly, the encoding complexity of the new frame can be expected to increase significantly. Therefore, the QP value should be increased, for example, proportionally to the strength of the motion. As shown in Equation (8), the QP may be increased by adding $\Delta QP$ to $QP_{normal}$. $QP_{normal}$ is used when the motion is not strong, and $QP_{normal} + \Delta QP$ is used when the motion is strong.

$$QP = \begin{cases} QP_{normal} + \Delta QP, \text{ if motion starts} \\ QP_{normal}, \text{ if no motion.} \end{cases} \quad (8)$$

In other embodiments, other algorithms can be used. For example, the linear model shown in Equation (2) can be modified by adjusting the parameter $a_1$ as below:

$$a_1 = \begin{cases} a_{1_{normal}} + p \times |S|, \text{ if } |S| \geq T \\ a_{1_{normal}}, \text{ if } |S| < T. \end{cases} \quad (9)$$

The parameter $a_1$ is adjusted in this manner because the stronger the motion, the higher MAD is going to be. Coefficient p can be selected empirically.

In another embodiment, the device 100 includes a gyroscope sensor. As discussed above, at step 402, the encoder 130 estimates the strength of a motion using the motion information from the sensor 120. The gyroscope sensor provides angular velocities around three axes, x, y, and z, respectively. In some embodiments, only the angular velocity readings around the x and y axes are considered in detecting a sudden motion since the angular velocity around the z axis represents a rotation in the image plane, and the user may still be capturing an object of interest.

To indicate the magnitude of the angular velocity, a pseudo velocity $\omega_p$ can be defined as in Equation (10) for simplicity:

$$\omega_p = |\omega_x| + |\omega_y| \quad (10).$$

The pseudo velocity $\omega_p$ is compared to a threshold according to Equation (12) for strong motion detection:

$$|\omega_p| = \begin{cases} \geq T, \text{ strong motion starts} \\ < T, \text{ smooth motion.} \end{cases} \quad (12)$$

As explained above, at step 403, the encoder 130 increases the QP if the strength of the motion meets the threshold value. As shown in Equation (8), the QP may be increased by adding $\Delta QP$ to $QP_{normal}$. $QP_{normal}$ is used when the motion is not strong, and $QP_{normal}+\Delta QP$ is used when the motion is strong.

In yet another embodiment, the device 100 includes a 3-axis magnetometer sensor. At step 402, the motion strength can be estimated using the Mean Squared Difference ("MSD") of multiple magnetometer readings according to Equation (5) and Equation (6), with $\vec{s}_g$ replaced by $\vec{s}_m$, which indicates raw magnetometer readings. At step 403, the QP is increased if the motion strength meets a threshold as explained above with respect to embodiments including an accelerometer and a gyroscope sensor.

At step 404, the encoder 130 decreases the QP if the strength of a motion is below the threshold value. Once the strong motion comes to a stop, the motion information provided by the sensor 120 will indicate that the strength of the motion falls below the threshold value. Once the end of the strong motion is detected, the encoder 130 decreases the QP to the normal value, thereby increasing the encoding rate. The actual timing of decreasing the QP may vary depending on the implementations of the encoder 130.

The motion information provided by the sensor 120 may also be used to further optimize the codec. In some embodiments, if the QP is increased, the frames obtained during the motion can be removed or dropped in order to further decrease the bit rate during the motion. In some embodiments, when the strong motion stops, an I-frame may be inserted at the time the QP is decreased to the normal value. In certain embodiments, the motion information provided by the sensor 120 can be used in motion estimation performed by the encoder 130. Motion estimation may be performed by, for example, the motion estimation unit 242 as shown in FIG. 2. Generally, motion estimation is the most time and power consuming portion of a codec, and the codec can be optimized by utilizing the motion information provided by the sensor 120. For example, if a motion is strong enough to trigger an increase in the QP, it can also trigger the motion estimation unit to increase the early termination threshold, decrease the search range, or use fast sub-pixel motion estimation algorithms.

One of ordinary skill in the art should understand that processes 300 and 400 are merely illustrative. Steps of process 300 and 400 may be removed, additional steps may be added, and/or the order of steps changed, while still being consistent with the principles and novel features disclosed herein. Moreover, the steps of process 300 and 400 may be performed by other modules, units, and/or devices.

The functionality described herein (e.g., with regard to one or more of the accompanying figures) may correspond in some aspects to similarly designated "means for" functionality in the appended claims. The functionality of the modules of FIGS. 1-2 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP communication, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor may read information from, and write information to, the storage medium. In the alternative, the storage medium may be integral to the processor. The processor and the storage medium may reside in an ASIC.

In one or more exemplary embodiments, the functions described may be implemented in hardware, software or firmware executed by a processor, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise non-transitory computer-readable storage media such as RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes flash memory storage, compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

The invention claimed is:

1. An apparatus for encoding video content, the apparatus comprising:
    one or more sensors configured to detect translation and rotation motion of the apparatus and provide information relating to the detected translation and rotation motion; and
    a processor configured to:
        encode the video content based at least in part on a quantization parameter, the processor being further configured to increase a value of the quantization parameter in proportion to an estimate of a speed or strength of the translation and rotation motion estimated from the provided information in response to determining that the estimated speed or strength of the translation and rotation motion exceeds a first threshold value; and
        perform motion estimation in connection with the video content, the processor being further configured to increase a second threshold for terminating motion estimation in response to increasing the value of the quantization parameter, wherein the motion estimation is terminated if the second threshold is exceeded.

2. The apparatus of claim 1, wherein the one or more sensors comprise an accelerometer sensor, a gyroscope sensor, a magnetometer sensor, or any combination thereof.

3. The apparatus of claim 2, wherein the estimation of the strength of the translation and rotation motion comprises determining a mean square difference of a plurality of readings from the one or more sensors.

4. The apparatus of claim 2, wherein the processor decreases the value of the quantization parameter subsequent to increasing the value of the quantization parameter when the speed or strength of the translation and rotation motion is below the threshold value.

5. The apparatus of claim 2, wherein the processor removes frames of the video content when the value of the quantization parameter is increased.

6. The apparatus of claim 4, wherein the processor inserts an I-frame when the value of the quantization parameter is decreased.

7. An apparatus for encoding video content, the apparatus comprising:
    means for detecting translation and rotation motion of the apparatus and providing information relating to the detected translation and rotation motion;
    means for encoding the video content based at least in part on a quantization parameter, the means for encoding the video content being further configured to increase a value of the quantization parameter in proportion to an estimate of a speed or strength of the translation and rotation motion estimated from the provided information in response to determining that the estimated speed or strength of the translation and rotation motion exceeds a first threshold value; and
    means for performing motion estimation in connection with the video content, the means for performing motion estimation being further configured to increase a second threshold for terminating motion estimation in response to increasing the value of the quantization parameter, wherein the motion estimation is terminated if the second threshold is exceeded.

8. The apparatus of claim 7, wherein the means for detecting translation and rotation motion comprises an accelerometer sensor, a gyroscope sensor, a magnetometer sensor, or any combination thereof.

9. The apparatus of claim 8, wherein estimating the strength of the translation and rotation motion comprises determining a mean square difference of a plurality of readings from the one or more sensors.

10. The apparatus of claim 8, wherein the means for encoding the video content decreases the value of the quantization parameter subsequent to increasing the value of the quantization parameter when the speed or strength of the translation and rotation motion is below the threshold value.

11. The apparatus of claim 8, wherein the means for encoding the video content removes frames of the video content when the value of the quantization parameter is increased.

12. The apparatus of claim 10, wherein the means for encoding the video content inserts an I-frame when the value of the quantization parameter is decreased.

13. A method of encoding video content comprising:
    detecting translation and rotation motion of an apparatus comprising one or more sensors and an encoder, using the one or more sensors;
    obtaining information relating to the detected translation and rotation motion;
    encoding the video content based at least in part on a quantization parameter using the encoder;

increasing a value of the quantization parameter in proportion to an estimate of a speed or strength of the translation and rotation motion estimated from the obtained information in response to determining that the estimated speed or strength of the translation and rotation motion exceeds a first threshold value;

performing motion estimation in connection with the video content; and increasing a second threshold for terminating motion estimation in response to increasing the value of the quantization parameter, wherein the motion estimation is terminated if the second threshold is exceeded.

14. The method of claim 13, wherein the one or more sensors comprise an accelerometer sensor, a gyroscope sensor, a magnetometer sensor, or any combination thereof.

15. The method of claim 14, wherein estimating the strength of the translation and rotation motion comprises determining a mean square difference of a plurality of readings from the one or more sensors.

16. The method of claim 14, further comprising decreasing the value of the quantization parameter subsequent to increasing the value of the quantization parameter when the speed or strength of the translation and rotation motion is below the threshold value.

17. The method of claim 14, wherein frames of the video content are removed when the value of the quantization parameter is increased.

18. The method of claim 16, wherein an I-frame is inserted when the value of the quantization parameter is decreased.

19. A non-transitory computer-readable medium storing instructions that cause an encoder to:

receive information relating to detected translation and rotation motion of an apparatus comprising the encoder, wherein the translation and rotation motion is detected by one or more sensors;

encode video content at least based in part on a quantization parameter;

increase a value of the quantization parameter proportion to an estimate of a speed or strength of the translation and rotation motion estimated from the received information in response to determining that the estimated speed or strength of the translation and rotation motion exceeds a first threshold value;

perform motion estimation in connection with the video content; and increase a second threshold for terminating motion estimation in response to increasing the value of the quantization parameter, wherein the motion estimation is terminated if the second threshold is exceeded.

20. The computer-readable medium of claim 19, wherein the information comprises motion information from one or more sensors comprising an accelerometer sensor, a gyroscope sensor, a magnetometer sensor, or any combination thereof.

21. The computer-readable medium of claim 20, wherein estimating the strength of the translation and rotation motion comprises determining a mean square difference of a plurality of readings from the one or more sensors.

22. The computer-readable medium of claim 20, further comprising instructions to cause the encoder to decrease the value of the quantization parameter subsequent to increasing the value of the quantization parameter when the speed or strength of the translation and rotation motion is below the threshold value.

23. The computer-readable medium of claim 20, wherein frames of the video content are removed when the value of the quantization parameter is increased.

24. The computer-readable medium of claim 22, wherein an I-frame is inserted when the value of the quantization parameter is decreased.

* * * * *